US009413874B2

(12) United States Patent
Kim

(10) Patent No.: US 9,413,874 B2
(45) Date of Patent: Aug. 9, 2016

(54) ELECTRONIC DEVICE, CONTROL METHOD, AND CONTROL PROGRAM

(71) Applicant: KYOCERA CORPORATION, Kyoto-shi, Kyoto (JP)

(72) Inventor: Talchi Kim, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/403,250

(22) PCT Filed: May 23, 2013

(86) PCT No.: PCT/JP2013/064388
§ 371 (c)(1),
(2) Date: Nov. 24, 2014

(87) PCT Pub. No.: WO2013/176226
PCT Pub. Date: Nov. 28, 2013

(65) Prior Publication Data
US 2015/0111616 A1    Apr. 23, 2015

(30) Foreign Application Priority Data

May 25, 2012  (JP) ................. 2012-119825

(51) Int. Cl.
| H04B 1/38 | (2015.01) |
| H04M 1/725 | (2006.01) |
| G06F 13/00 | (2006.01) |
| G06F 3/0481 | (2013.01) |
| G06F 3/0484 | (2013.01) |
| G06F 3/0488 | (2013.01) |

(52) U.S. Cl.
CPC ......... *H04M 1/72563* (2013.01); *G06F 3/0481* (2013.01); *G06F 3/0484* (2013.01); *G06F 3/0488* (2013.01); *G06F 3/04817* (2013.01); *G06F 13/00* (2013.01); *H04M 1/72569* (2013.01)

(58) Field of Classification Search
CPC ..... G06F 3/04817; G06F 3/0481; G06F 8/60; G06F 3/0488
USPC ................ 455/566, 550, 550.1, 575.1, 556.1, 455/556.2, 90.3, 90.2, 403, 422.1; 345/173, 345/169
See application file for complete search history.

(56) References Cited

U.S. PATENT DOCUMENTS

2011/0061016 A1*  3/2011  Song ................... H04L 63/107
715/779

FOREIGN PATENT DOCUMENTS

| JP | 10-031510 A | 2/1998 |
| JP | 2006-048574 A | 2/2006 |
| WO | 2008086302 A1 | 7/2008 |

OTHER PUBLICATIONS

International Search Report mailed Jun. 18, 2013, in corresponding International Application No. PCT/JP2013/064388.

* cited by examiner

*Primary Examiner* — Keith Ferguson
(74) *Attorney, Agent, or Firm* — Hauptman Ham, LLP

(57) ABSTRACT

According to one of some aspects, an electronic device includes: a display configured to display an icon corresponding to an application that performs communication with external; and a controller configured to change a display mode of the icon corresponding to the application based on a condition of the communication with the external.

4 Claims, 11 Drawing Sheets

FIG.6

| RECOMMENDED COMMUNICATION ENVIRONMENT INFORMATION ||
|---|---|
| APPLICATION | RECOMMENDED COMMUNICATION SPEED |
| E-MAIL APPLICATION | a |
| BROWSER APPLICATION | b |
| NAVIGATOR APPLICATION | c |
| VIDEO PLAYER APPLICATION | d |
| SNS APPLICATION | e |
| ... | ... |

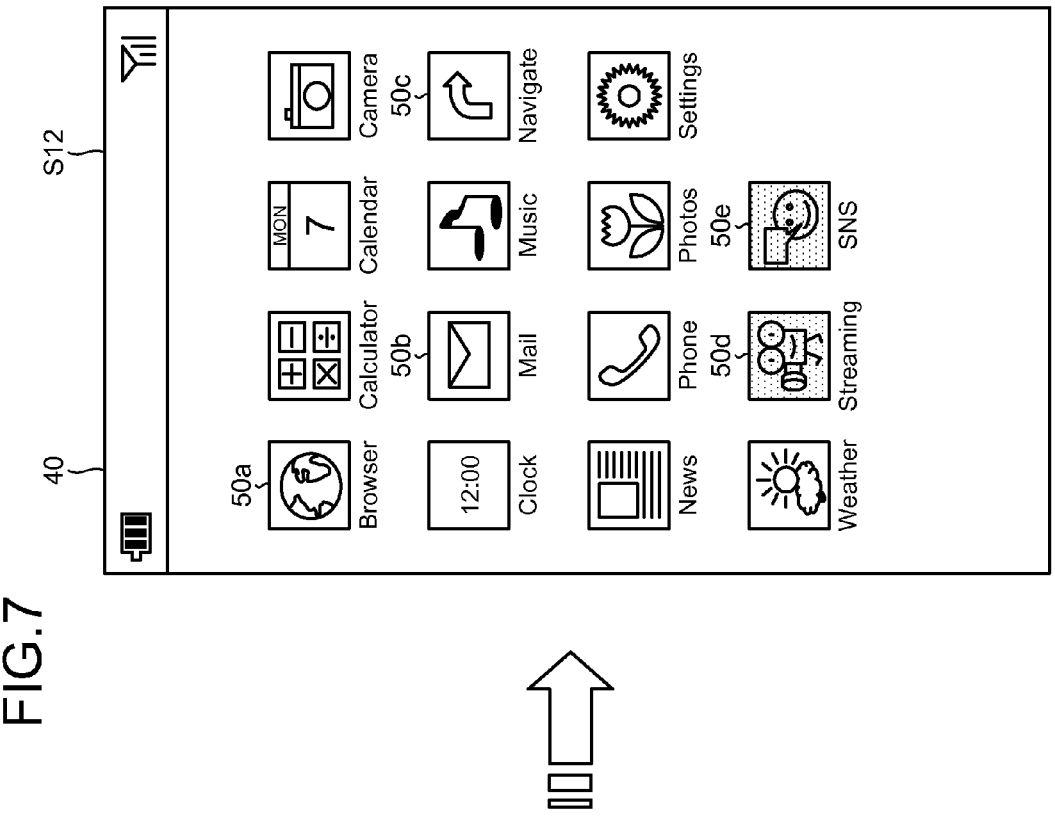
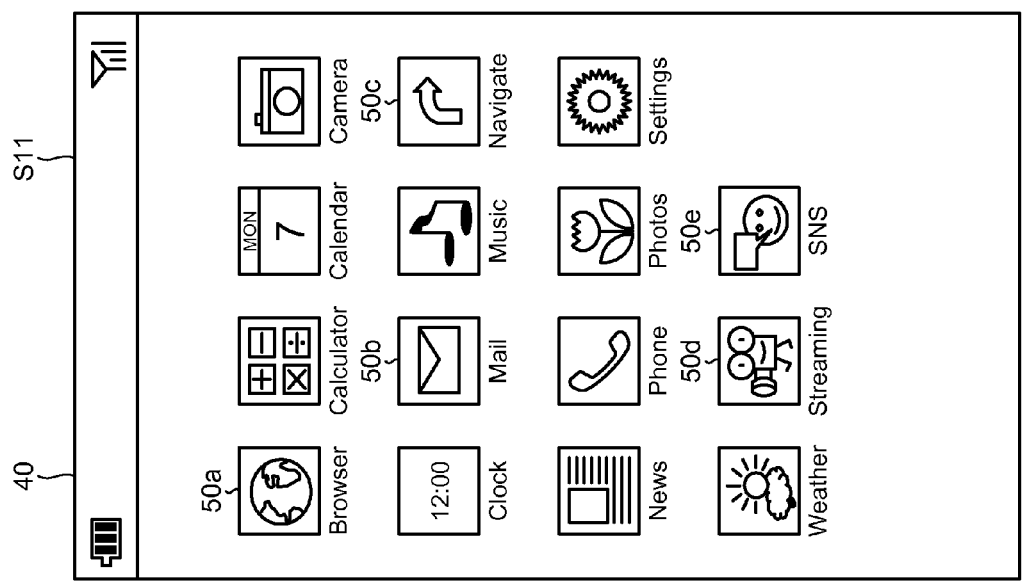
FIG.7

FIG.8
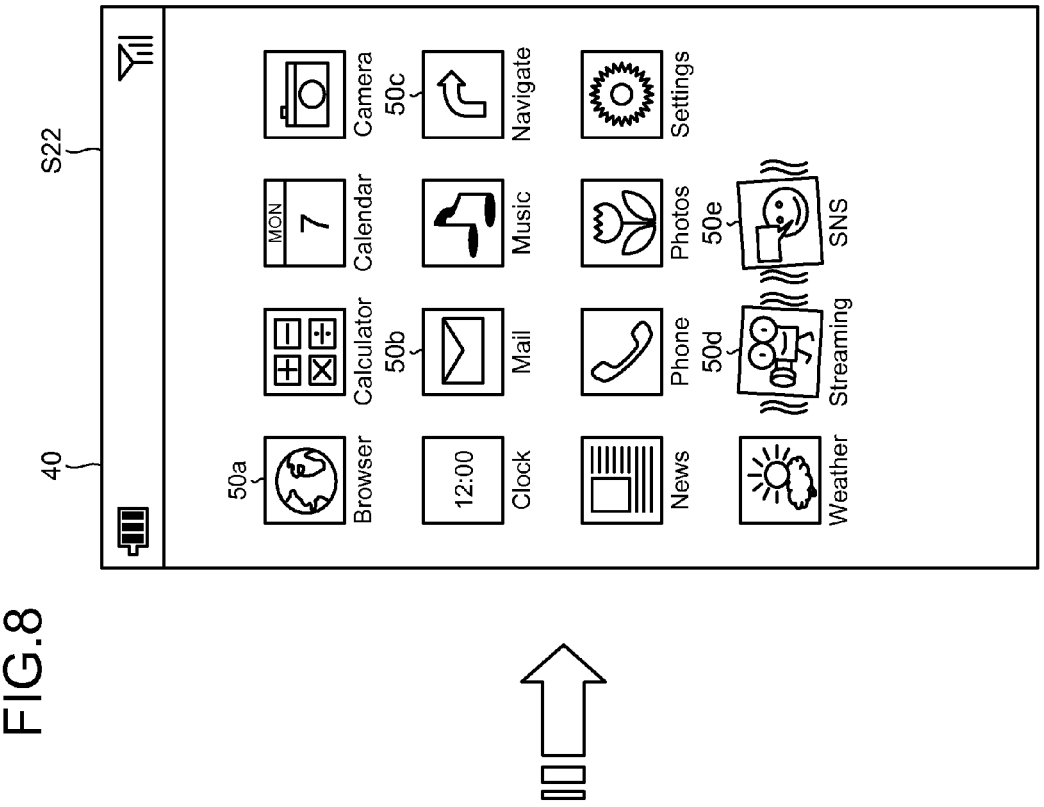
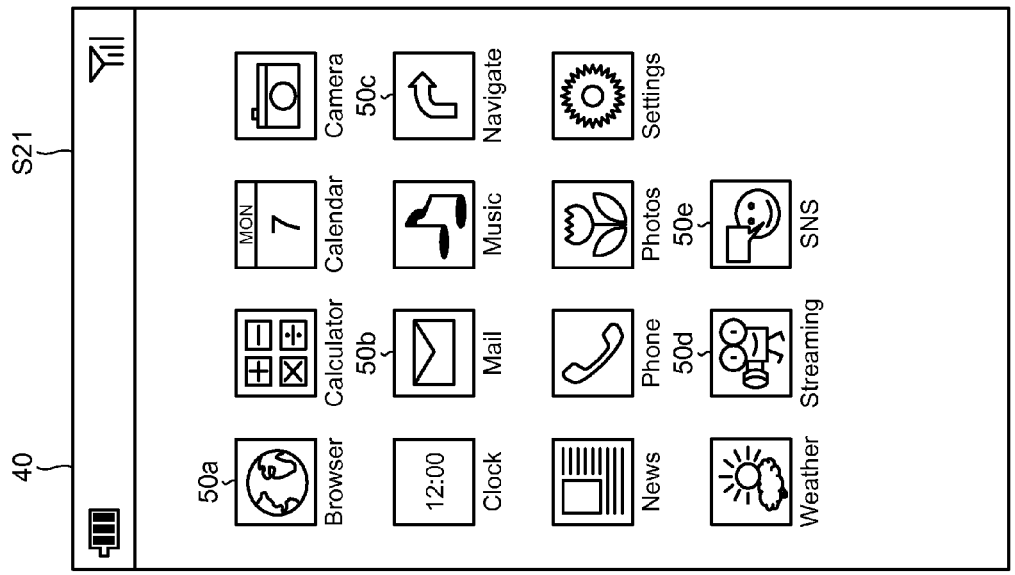

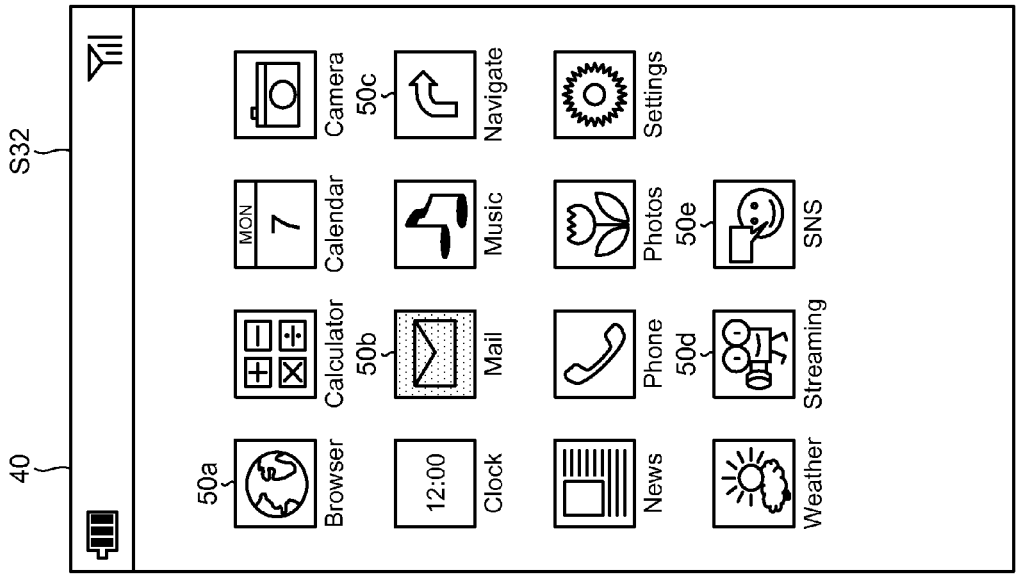
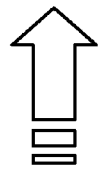
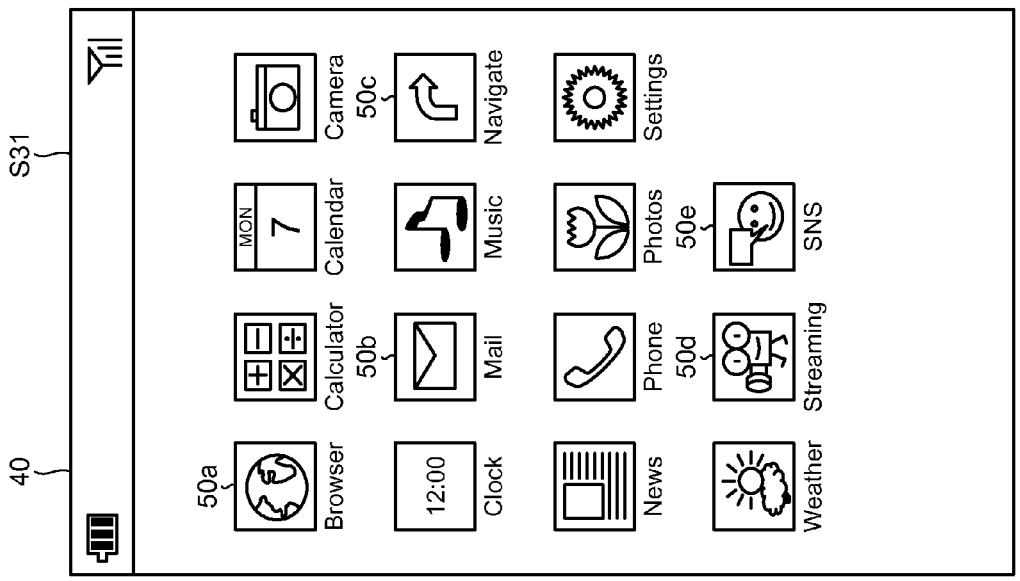
FIG.10

ELECTRONIC DEVICE, CONTROL METHOD, AND CONTROL PROGRAM

CROSS-REFERENCE TO RELATED APPLICATION

The present application is a National Phase of International Application Number PCT/JP2013/064388 filed on May 23, 2013, and claims the benefit of priority from Japanese Patent Application No. 2012-119825 filed on May 25, 2012.

FIELD

The present application relates to an electronic device, a control method, and a control program.

BACKGROUND

Examples of a known mobile device enabled to be carried by a user include a mobile phone and a personal handy-phone system (PHS) having the function of a telephone, and a touch screen device with a touch screen.

Examples of a touch screen device include, but are not limited to, a smartphone and a tablet. A touch screen device detects a gesture of a finger, a pen, or a stylus pen via a touch screen, and operates in response to the detected gesture. An example of such an operation executed in response to a detected gesture is disclosed in Patent Literature 1.

Basic operations of a touch screen device, a mobile phone, and a PHS are implemented by an operating system (OS) incorporated in the device. Examples of an OS include, but are not limited to, Android (registered trademark), BlackBerry (registered trademark) OS, iOS, Symbian (registered trademark) OS, and Windows (registered trademark) Phone.

Some touch screen devices have a function for displaying an icon corresponding to an application installed in the touch screen device on a home screen or the like to allow a user to execute the application with a simple operation. Some mobile phones and PHSes have a function for displaying an operation panel corresponding to the application on the display.

CITATION LIST

Patent Literature

Patent Literature 1: International Publication Pamphlet No. WO 2008/086302

Technical Problem

Some applications executed on a mobile device without any touch screen such as a mobile phone, or on a touch screen device with the communication capability such as a smartphone communicate with the external. Examples of the communication of a mobile device or a screen device with the external performed include, but are not limited to, replaying of a streaming multimedia file such as a video, accessing a web site, and exchanging text data. It is however sometimes unclear for a user if the current communication condition allow the user to use such an application communicating with the external.

For the foregoing reasons, there are needs for an electronic device, a control method, and a control program capable of notifying a user of the availability of an application that communicates with the external.

SUMMARY

According to one of some aspects, an electronic device includes: a display configured to display an icon corresponding to an application that performs communication with external; and a controller configured to change a display mode of the icon corresponding to the application based on a condition of the communication with the external.

According to one of some aspects, a control method is executed by an electronic device including a display. The control method includes: displaying an icon corresponding to an application that performs communication with external; and changing a display mode of the icon corresponding to the application based on a condition of the communication with the external.

According to one of some aspects, a control program causes an electronic device including a display to execute: displaying an icon corresponding to an application that performs communication with external; and changing a display mode of the icon corresponding to the application based on a condition of the communication with the external.

BRIEF DESCRIPTION OF DRAWINGS

FIG. 6 is a schematic of an example of recommended communication environment information stored in a storage.

FIG. 7 is a schematic of an example of how a display mode is changed based on a function provided by a control program.

FIG. 8 is a schematic of another example of how a display mode is changed based on the function provided by the control program.

FIG. 10 is a schematic of an example of the control based on the function provided by the control program.

DESCRIPTION OF EMBODIMENTS

Embodiments for enabling implementation of an electronic device, a control method, and a control program according to the present application will now be explained in detail with reference to some drawings. Descriptions below are not intended to limit the scope of the electronic device, the control method, and the control programs according to the present application in any way. The elements disclosed in the following descriptions include those that can be easily conceived by those skilled in the art, those that are substantially the same, and those within what is called a scope of equivalents. In the description below, a smartphone with a touch screen is used as an example of the electronic device.

Some Embodiments

Figure 1:
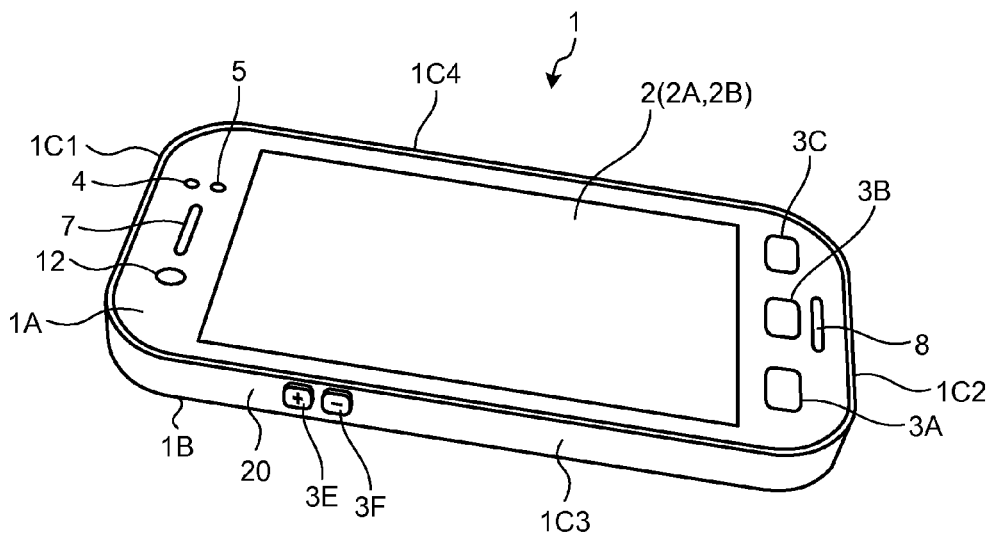
FIG. 1 is a perspective view of a smartphone according to one of some embodiments.
Figure 2:
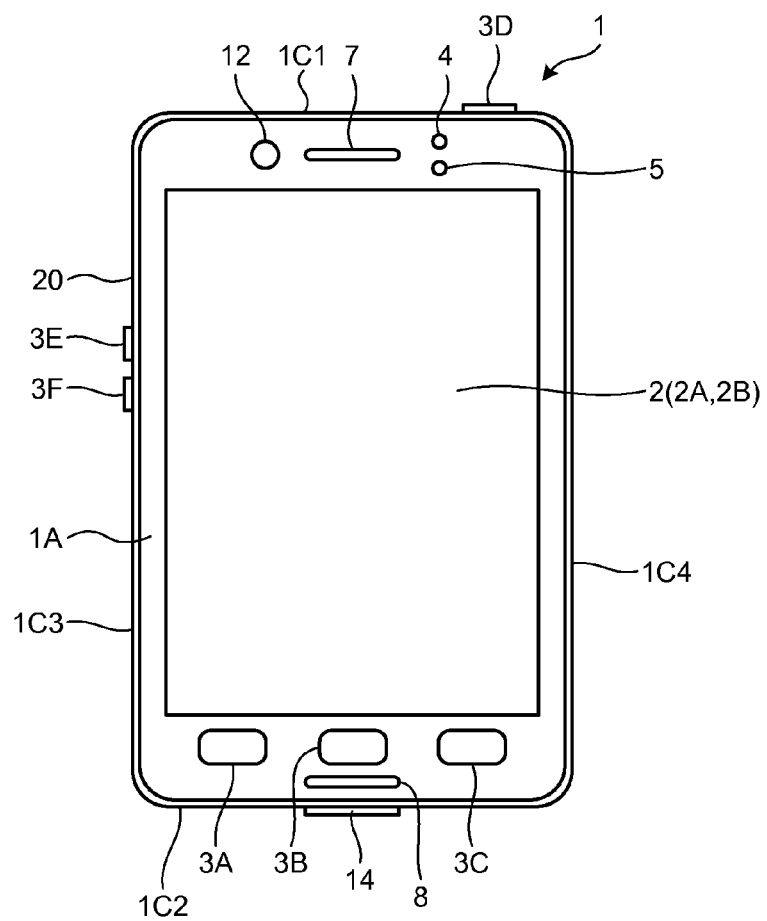
FIG. 2 is a front view of the smartphone.
Figure 3:
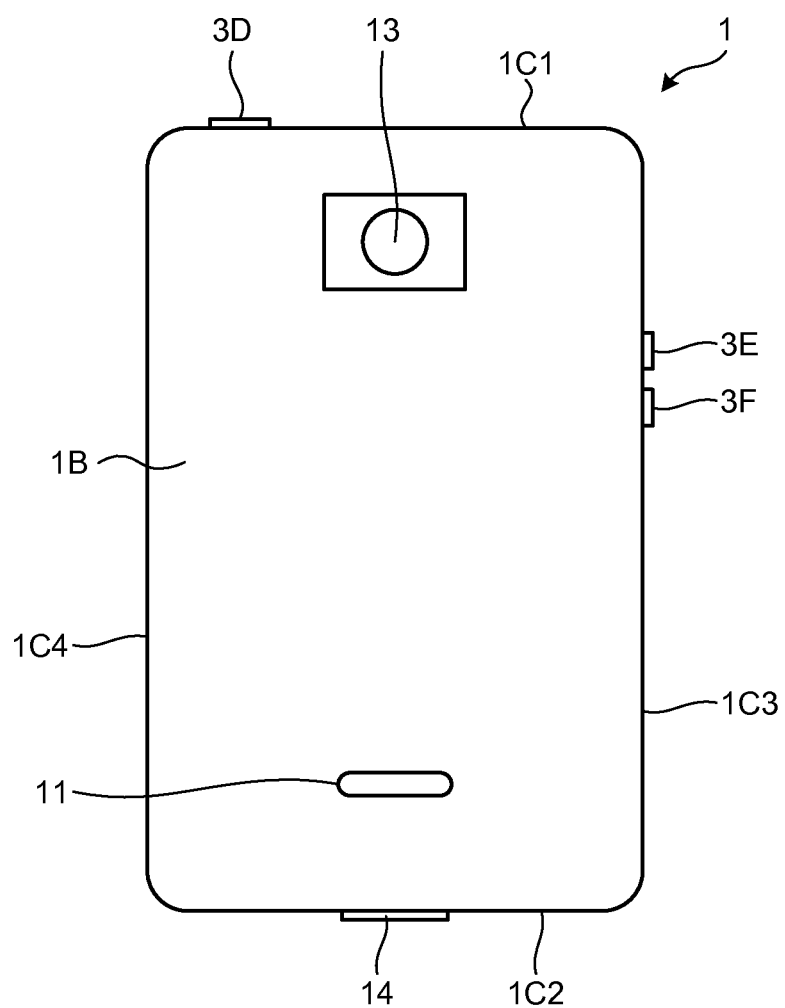
FIG. 3 is a rear view of the smartphone.

The overall configuration of this smartphone 1 according to embodiments will now be explained with reference to FIGS. 1 to 3. FIG. 1 is a perspective view of the smartphone according to one of some embodiments. FIG. 2 is a front view of the smartphone. FIG. 3 is a rear view of the smartphone. As illustrated in FIGS. 1 to 3, the smartphone 1 has a housing 20. The housing 20 has a front face 1A, a back face 1B, and side faces 1C1 to 1C4. The front face 1A is a front surface of the housing 20. The back face 1B is a rear surface of the housing 20. The side faces 1C1 to 1C4 are side surfaces that connect the front face 1A to the back face 1B. Hereinafter, the side faces 1C1 to 1C4 may be generally referred to as a side face 1C, without specifying which one of the side surfaces the side face is.

The smartphone 1 includes a touch screen display 2, buttons 3A to 3C, an illuminance sensor 4, a proximity sensor 5, a receiver 7, a microphone 8, and a camera 12 that are positioned on the front face 1A. The smartphone 1 includes a speaker 11 and a camera 13 positioned on the back face 1B. The smartphone 1 also includes buttons 3D to 3F and a connector 14 on the side faces 1C. Hereinafter, the buttons 3A to 3F may be generally referred to as a button 3, without specifying which one of the buttons 3A to 3F the button 3 is.

The touch screen display 2 includes a display 2A and a touch screen 2B. In the example illustrated in FIG. 1, the display 2A and the touch screen 2B both have an approximate rectangular shape, but the shapes of the display 2A and the touch screen 2B are not limited thereto. The display 2A and the touch screen 2B may be any shape, including a square or a circle. In the example illustrated in FIG. 1, the display 2A and the touch screen 2B are laid on top of each other, but the arrangement of the display 2A and the touch screen 2B is not limited thereto. The display 2A and the touch screen 2B may be arranged side by side, or separated from each other, for example. In the example illustrated in FIG. 1, the long sides of the display 2A extend along the long sides of the touch screen 2B, and the short sides of the display 2A extend along the short sides of the touch screen 2B, but how the display 2A and the touch screen 2B are laid on top of each other is not limited thereto. In a configuration in which the display 2A and the touch screen 2B are laid on top of each other, one or more sides of the display 2A may not extend along any side of the touch screen 2B, for example.

The display 2A is provided with a display device such as a liquid crystal display (LCD), an organic electro-luminescence display (GELD), or an inorganic electro-luminescence display (IELD). The display 2A displays characters, images, symbols, figures, and the like.

The touch screen 2B detects contact of a finger, a pen, a stylus pen, or the like with the touch screen 2B. The touch screen 2B is capable of detecting the positions of the contact of a plurality of fingers, pens, stylus pens, or the like with the touch screen 2B. In the description hereunder, a finger, a pen, a stylus pen, or the like that contacts with the touch screen 2B may be referred to as a "contacting object".

Any technology such as capacitive sensing, resistive sensing, surface acoustic wave (SAW) (or ultrasonic) sensing, infrared sensing, electromagnetic induction sensing, and load sensing, may be used to allow the touch screen 2B to detect contact. To simplify the explanation, in the described below, the explanation is made supposing that the user operates the smartphone 1 by touching the touch screen 2B with a finger.

The smartphone 1 determines the type of a gesture based on at least one of contact detected by the touch screen 2B, the position at which the contact is detected, a change in the position at which the contact is detected, the interval at which the contacts are detected, and the number of times that the contacts ate detected. A gesture is an operation performed on the touch screen 2B. Examples of the gesture the type of which is determined by the smartphone 1 include, but are not limited to, a touch, a long touch, a release, a swipe, a tap, a double-tap, a long tap, a drag, a flick, a pinch-in, and a pinch-out.

A "touch" is a gesture of touching the touch screen 2B with a finger. The smartphone 1 determines a gesture of touching the touch screen 2B with a finger as a touch. A "long touch" is a gesture of touching the touch screen 2B with a finger for a longer time than a predetermined time. The smartphone 1 determines a gesture of touching the touch screen 2B with a finger for a longer time than the predetermined time as a long touch.

A "release" is a gesture of removing a finger from the touch screen 2B. The smartphone 1 determines a gesture of removing a finger from the touch screen 2B as a release. A "swipe" is a gesture of moving a finger across the touch screen 2B while keeping the finger in contact with the touch screen 2B. The smartphone 1 determines a gesture of moving a finger across the touch screen 2B while keeping the finger in contact with the touch screen 2B as a swipe.

A "tap" is a gesture of performing a release subsequent to a touch. The smartphone 1 determines a gesture of performing a release subsequent to a touch as a tap. A "double-tap" is a gesture of making a touch-and-release twice. The smartphone 1 determines a gesture of making a touch-and-release twice as a double-tap.

A "long tap" is a gesture of performing a release subsequent to a long touch. The smartphone 1 determines a gesture performing of a release subsequent to a long touch as a long tap. A "drag" is a gesture of a swipe started from an area where a movable object is displayed. The smartphone 1 determines a gesture of a swipe started from a region where a movable object is displayed as a drag.

A "flick" is a gesture of touching the touch screen 2B and sliding the finger away from the touch screen 2B. In other words, a "flick" is a gesture of releasing a moving finger after a touch. The smartphone 1 determines a gesture of touching the touch screen 2B and releasing a moving finger away from the touch screen 2B as a flick. A flick is often performed while the finger is moved in one direction. A flick includes a "flick-up" in which the finger is moved upwardly in the screen, a "flick-down" in which the finger is moved downwardly in the screen, a "flick-to-right" in which the finger is moved to the right in the screen, and a "flick-to-left" in which the finger is moved to the left in the screen. In a flick, a finger is often moved quicker than in a swipe.

A "pinch-in" is a gesture of swiping a plurality of fingers in directions approaching to one another. The smartphone 1 determines a gesture of moving fingers in directions reducing the distance between the positions of one finger and the other finger(s) detected by the touch screen 2B as a pinch-in. A "pinch-out" is a gesture of swiping a plurality of fingers in directions away from to one another. The smartphone 1 determines a gesture of moving fingers in directions extending the distance between the positions of one finger and the other finger(s) detected by the touch screen 2B as a pinch-out.

In the embodiments, a gesture performed with one finger may be referred to as a "single touch gesture". In the embodiments, a gesture made with two or more fingers may be referred to as a "multi-touch gesture". A pinch-in and a pinch-out correspond to a multi-touch gesture. A tap, a flick, and a swipe, for example, correspond to a single touch gesture, if such a gesture is made with one finger, and correspond to a multi-touch gesture if two or more fingers are used.

The smartphone 1 operates in response to a gesture the type of which includes those described above, and is determined via the touch screen 2B, so that intuitive and easy-to-use operability for users can be achieved. The smartphone 1 may perform different operations in response to the determined type of a gesture, depending on the screen displayed on the display 2A. Hereinafter, the operation of the touch screen 2B detecting a gesture and the smartphone 1 determining the type of the gesture as "X" is sometimes simply described as an operation of "the smartphone 1 detecting X", or of "the controller detecting X", in order to simplify the description.

Figure 4:
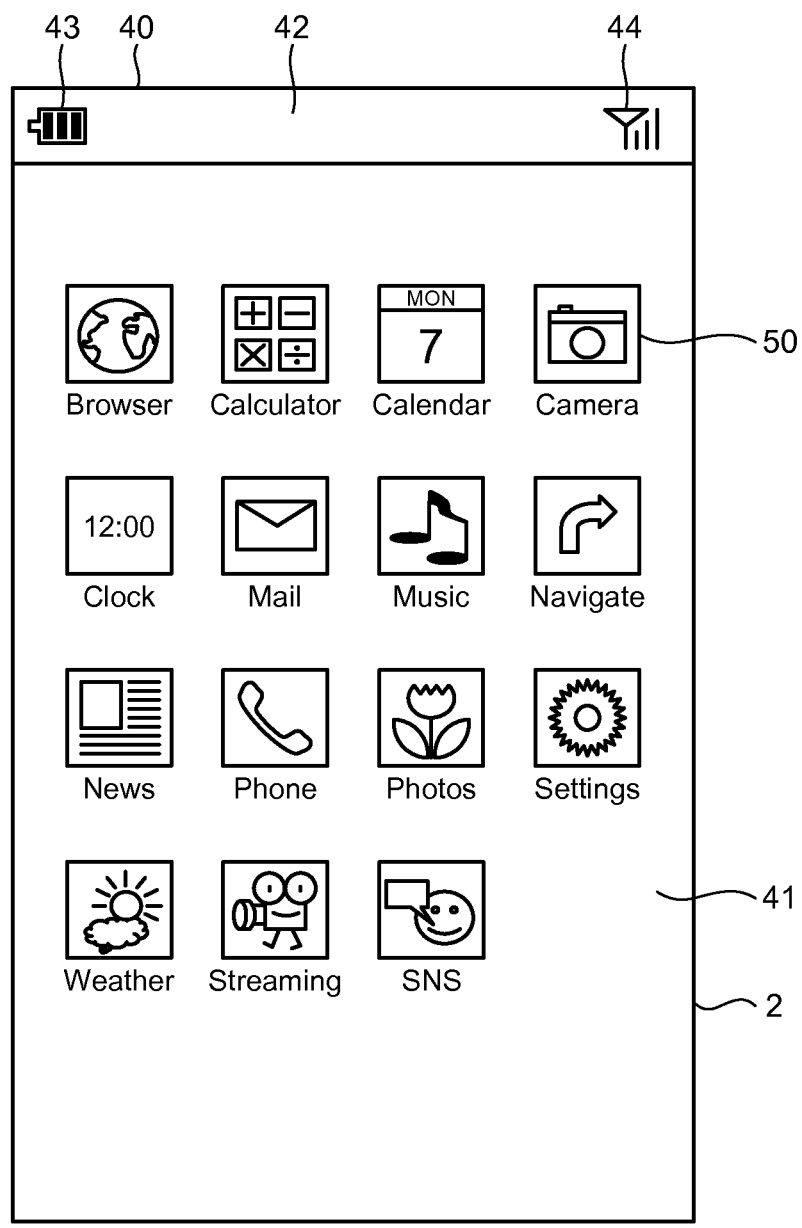
FIG. 4 is a schematic of an example of a home screen.

An example of a screen displayed on the display 2A will now be explained with reference to FIG. 4. FIG. 4 is a schematic of an example of the home screen. A home screen is also referred to as a desktop, a standby screen, an idle screen, or a standard screen. The home screen is displayed on the display 2A. The home screen is a screen allowing a user to select which one of the applications installed in the smartphone 1 is to be executed. The smartphone 1 executes the application selected on the home screen in the foreground. A screen of the application executed in the foreground is displayed on the display 2A.

Icons can be arranged on the home screen of the smartphone 1. A plurality of icons 50 are arranged on the home screen 40 illustrated in FIG. 4. Each of the icons 50 is associated in advance with the corresponding application installed in the smartphone 1. When the smartphone 1 detects a gesture on an icon 50, the smartphone 1 executes the application associated with the icon 50 on which the gesture is detected. For example, when the smartphone 1 detects a tap on the icon 50 associated with an e-mail application, the smartphone 1 executes the e-mail application.

The icon 50 includes an image and a character string. The icon 50 may include a symbol or a figure instead of an image. The icon 50 may omit one of an image or a character string. The icons 50 are arranged based on a layout pattern. A wall paper 41 is displayed behind the icons 50. A wall paper is also referred to as a photo screen, a back screen, an idle image, or a background image. The smartphone 1 can use any image as the wall paper 41. The smartphone 1 may allow a user to select the image to be displayed as the wall paper 41.

The smartphone 1 may have a plurality of home screens. The smartphone 1 determines the number of home screens based on a setting provided by a user, for example. Although the home screen may be provided in plurality, the smartphone 1 displays selected one of the home screens on the display 2A.

The smartphone 1 is capable of changing the home screen displayed on the display 2A. When a gesture is detected while one of the home screens is displayed, the smartphone 1 changes the home screen displayed on the display 2A to another home screen. For example, when a flick-to-right is detected, the smartphone 1 changes the home screen displayed on the display 2A to an adjacent home screen arranged on the left. As another example, when a flick-to-left is detected, the smartphone 1 changes the home screen displayed on the display 2A to an adjacent home screen arranged on the right. When a gesture is detected while a first home screen is displayed on the display 2A, the smartphone 1 changes the home screen displayed on the display 2A from the first home screen to a second home screen in such a manner that the first home screen displayed on the display 2A becomes gradually smaller and the second home screen displayed on the display 2A becomes gradually larger. Alternatively, the smartphone 1 may swap the home screens in such a manner that the first home screen is immediately replaced with the second home screen.

An area 42 is provided at the upper end of the display 2A. The area 42 has a remaining battery indicator 43 indicating the amount of remaining battery, and a signal level indicator 44 indicating the strength of the electric field of the electric waves used in the communication. The smartphone 1 may also display the time of the day, weather, an active application, a type of the communication system, calling status, device mode, events occurred in the device in the area 42, and the like. In this manner, the area 42 is used for providing various notifications to the user. The area 42 may also be provided to a screen other than the home screen 40. The position where the area 42 is provided is not limited to the upper end of the display 2A.

The home screen 40 illustrated in FIG. 4 is exemplary, and the forms and the arrangement of various elements, the number of the home screens 40, and various types of operations performed on the home screen 40 do not necessarily need to be as described herein.

Figure 5:
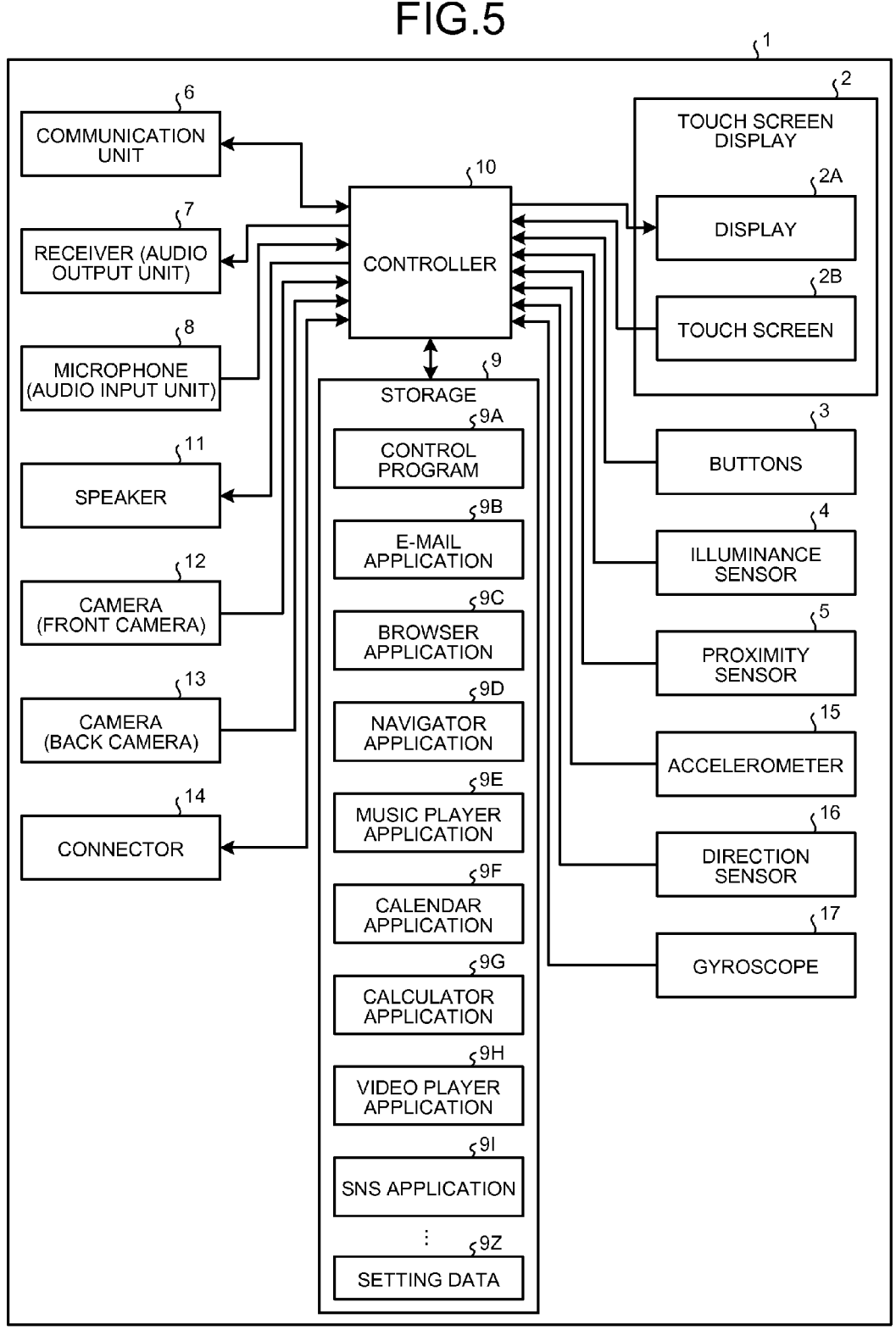
FIG. 5 is a block diagram of the smartphone.

FIG. 5 is a block diagram of the smartphone 1. The smartphone 1 includes the touch screen display 2, the buttons 3, the illuminance sensor 4, the proximity sensor 5, communication unit 6, a receiver 7, the microphone 8, a storage 9, a controller 10, the speaker 11, the cameras 12 and 13, the connector 14, an accelerometer 15, a direction sensor 16, and a gyroscope 17.

The touch screen display 2 includes the display 2A and the touch screen 2B, as mentioned earlier. The display 2A displays characters, images, symbols, figures, and the like. The touch screen 2B detects gestures.

The buttons 3 are operated by a user. The buttons 3 include the buttons 3A to 3F. The controller 10 detects an operation performed on the button 3 in cooperation with the button 3. Examples of the operations performed on the button 3 include, but are not limited to, a click, a double click, a triple click, a push, and a multi-push.

The buttons 3A to 3C are, for example, "Home" button, "Back" button, and "Menu" button, respectively. The button 3D is a power-on/off button for the smartphone 1, for example. The button 3D may also function as a sleep/wake-from-sleep button. The buttons 3E and 3F are volume buttons, for example.

The illuminance sensor 4 detects the illuminance of the ambient light around the smartphone 1. Illuminance represents a light intensity, brightness, or luminance. The illuminance sensor 4 is used in adjusting the luminance of the display 2A, for example. The proximity sensor 5 detects the presence of a nearby object in a non-contact fashion. The proximity sensor 5 detects the presence of an object based on a change in the magnetic field, or based on a change in the return time of an ultrasonic reflection wave, for example. The proximity sensor 5 detects a face approaching the touch screen display 2, for example. The illuminance sensor 4 and the proximity sensor 5 may be configured as one sensor. The illuminance sensor 4 may be used as a proximity sensor.

The communication units 6 communicate wirelessly. The communication scheme supported by the communication units 6 is wireless communication standard. Examples of the wireless communication standard include cellular phone communication standards such as 2G, 3G, and 4G. Examples of the cellular phone communication standards include Long Term Evolution (LTE), Wideband Code Division Multiple Access (W-CDMA), CDMA 2000, Personal Digital Cellular (PDC), Global System for Mobile Communications (GSM) (registered trademark), and Personal Handy-phone System (PHS). Examples of the wireless communication standards further include Worldwide Interoperability for Microwave Access (WiMAX), IEEE 802.11, Bluetooth (registered trademark), Infrared Data Association (IrDA), Near Field Communication (NFC), etc.

The communication speed that can be achieved in fact (hereinafter, referred to as an effective communication speed) of the communication unit 6 varies depending on communication conditions. For example, when data being received has a high error rate, the amount of data retransmission is increased, so that the amount of data received for the first time is reduced, and the effective communication speed is decreased. When the communication unit 6 supports at least one of adaptive modulation in which the modulation scheme is changed depending on the communication conditions, and adaptive coding in which the encoding scheme is changed depending on the communication conditions, the effective communication speed changes depending on the selected scheme(s).

The receiver 7 and the speaker 11 are audio output units. The receiver 7 and the speaker 11 output an audio signal received from the controller 10 as a sound. The receiver 7 is used to output the voice of a person on the other side of the telephone, for example. The speaker 11 is used to output a ringtone or a piece of music, for example. One of the receiver 7 and the speaker 11 may provide the function of the other. The microphone 8 is an audio input unit. The microphone 8 converts the voice of a user or the like into audio signal, and transmits the signal to the controller 10.

The storage 9 stores therein computer programs and data. The storage 9 is used as a working area temporarily storing therein results of processes executed by the controller 10. The storage 9 may include any non-transitory storage medium such as a semiconductor storage medium and a magnetic storage medium. The storage 9 may include a plurality of types of storage media. The storage 9 may include a combination of a portable non-transitory storage medium such as a memory card, an optical disc, or a magneto-optical disk, and a reader for the storage medium. The storage 9 may include a storage device to be used as a temporary storage area such as a random access memory (RAM).

The computer programs stored in the storage 9 include applications that are executed on foreground or on the background, and control programs that support the operations of the applications. An application causes the display 2A to display a screen, and causes the controller 10 to execute a process corresponding to a gesture detected by the touch screen 2B, for example. An example of the control programs is an OS. Such applications and control programs may be installed in the storage 9 via wireless communication established by the communication unit 6, or via a non-transitory storage medium.

The storage 9 stores therein, for example, a control program 9A, an e-mail application 9B, a browser application 9C, a navigator application 9D, a music player application 9E, a calendar application 9F, a calculator application 9G, a video player application 9H, a social network service (SNS) application 9I, and setting data 9Z. The e-mail application 9B provides an e-mail function for composing, transmitting, receiving, and displaying e-mails, for example. The browser application 9C provides a web browser function for displaying web pages. The navigator application 9D provides a navigation function for guiding a route, for example. The music player application 9E provides a player function for replaying a piece of music and outputting the music from the receiver 7 or the speaker 11. The calendar application 9F provides a calendar function for managing the schedule, for example. The calculator application 9G provides a calculator function for performing four arithmetic operations, for example. The video player application 9H provides a streaming function for replaying a multimedia file, such as a piece of music or a video, in real-time while downloading the file. The SNS application 9I provides a function for accessing a community web site used for chatting, blogging, and the like. The setting data 9Z includes information related to various settings related to the operation of the smartphone 1. The setting data 9Z includes, for example, information of a recommended communication speed for each one of the applications that communicate with the external via the communication unit 6.

FIG. 6 is a schematic of an example of recommended communication environment information stored in the storage 9. As illustrated in FIG. 6, the setting data Z stored in the storage 9 includes information of a recommended communication speed for each of the e-mail application 9B, the browser application 9C, the navigator application 9D, the video player application 9H, and the SNS application 9I that communicate with the external. For example, the setting data Z includes a recommended communication speed "a" for e-mail application 9B, a recommended communication speed "b" for the browser application 9C, a recommended communication speed "c" for the navigator application 9D, a recommended communication speed "d" for the video player application 9H, and a recommended communication speed "e" for the SNS application 9I. The recommended communication speed is a recommendation of a downlink communication speed used in receiving data. As the recommended communication speed, for example, a communication speed that the vendor of the application specifies as a recommended speed or a required speed may be used. The recommended communication speed may be calculated based on the measurements of the amount of received data and the time required for receiving the data while the application is being executed. The recommended communication environment information may include a recommended uplink communication speed used in data transmissions, in addition to a recommended downlink communication speed. The recommended communication speed may be the communication speed itself, or one of the ranks into which communication speeds are classified.

The control program 9A provides functions related to various types of control for causing the smartphone 1 to operate. For example, the control program 9A establishes communication with the external by controlling the communication unit 6. The control program 9A also establishes a voice call by controlling the communication unit 6, the receiver 7, the microphone 8, and the like. The functions provided by the control program 9A include a function for executing various types of control, including that for changing the information displayed on the display 2A in response to a gesture detected via the touch screen 2B. The functions provided by the control program 9A may be used in combination with the function provided by another computer program, such as the e-mail application 9B. The functions provided by the control program 9A also include a function of changing the display mode of an icon corresponding to an application that communicates with the external via the communication unit 6 depending on the communication conditions with the external. Examples of the external include: a web site accessed by the web browsing function provided by the browser application 9C over the Internet; an e-mail server accessed by the e-mail function provided by the e-mail application 9B over the Internet; a database (a server of an operator) accessed by the navigation function provided by the navigator application 9D over the Internet; a content server (a server of an operator) accessed by the streaming function provided by the video player application 9H over the Internet; and an SNS server (a server of an operator) accessed by the access function provided by the SNS application 9I over the Internet.

In the present application, examples of activating a computer program (application) by the controller 10 include: reading newly the computer program stored in the storage 9 and starting the process thereof; and starting newly the process of a computer program that has already been read. In the present application, examples of executing a computer program by the controller 10 include: activating the computer program; resuming the computer program that is currently suspended; and continuing the process of the computer program that is active.

The controller 10 is a processor. Examples of the processor include, but are not limited to, a central processing unit (CPU), a system-on-a-chip (SoC), a micro control unit (MCU), and a field-programmable gate array (FPGA). The controller 10 implements various functions by integrally controlling the operation of the smartphone 1.

Specifically, the controller 10 executes instructions included in the computer programs stored in the storage 9 while referring to the data stored in the storage 9 as required. The controller 10 then implements various functions by controlling functional units based on the data and the instructions. Examples of the functional units include, but are not limited to, the display 2A, the communication unit 6, the microphone 8, and the speaker 11. The controller 10 may change the control based on the detection results of detecting units. Examples of the detecting units include, but are not limited to, the touch screen 2B, the buttons 3, the illuminance sensor 4, the proximity sensor 5, the receiver 7, the camera 12, the camera 13, the accelerometer 15, the direction sensor 16, and the gyroscope 17.

For example, the controller 10 executes the control program 9A, and thereby perform various types of control for changing the display mode of an icon corresponding to an application that communicates with the external via the communication unit 6, based on a condition of the communication with the external.

The camera 12 is a front camera for capturing an image of an object facing the front face 1A. The camera 13 is a back camera for capturing an image of an object facing the back face 1B.

The connector 14 is a connector terminal to which another device is connected. The connector 14 may be a general terminal such as a universal serial bus (USB), High-Definition Multimedia Interface (HDMI) (registered trademark), Light Peak (Thunderbolt (registered trademark)), or an earphone and microphone connector. The connector 14 may be a dedicated terminal such as a Dock connector. Examples of the devices connected to the connector 14 include, but are not limited to, an external storage, a speaker, and a communication device.

The accelerometer 15 detects the direction and the amount of the acceleration working on the smartphone 1. The direction sensor 16 detects the direction of geomagnetism. The gyroscope 17 detects an angle and an angular velocity of the smartphone 1. The detection results of the accelerometer 15, the direction sensor 16, and the gyroscope 17 are used in combination to detect a change in the position and the attitude of the smartphone 1.

The part or the whole of the computer programs and the data stored in the storage 9 in FIG. 5 may be downloaded from another device over wireless communication established by the communication unit 6. The part or the whole of the computer programs and the data stored in the storage 9 in FIG. 5 may be stored in a non-transitory storage medium readable by a reader included in the storage 9. The part or the whole of the computer programs and the data stored in the storage 9 in FIG. 5 may be stored in a non-transitory storage medium readable by a reader connected to the connector 14. Examples of the non-transitory storage medium include, but are not limited to, an optical disk such as a compact disc, (CD) (registered trademark), a digital versatile disc (DVD) (registered trademark), a Blu-ray (registered trademark), a magneto-optical disk, an magnetic storage medium, a memory card, and a solid-state storage medium.

The configuration of the smartphone 1 illustrated in FIG. 5 is exemplary, and may be modified as appropriate as long as the essence of the present invention is not impaired. For example, the number and the type of the buttons 3 are not limited to the example illustrated in FIG. 5. As the buttons for making operations related to the screen, the smartphone 1 may be provided with buttons in the arrangement of a numeric key pad or in a QWERTY layout, instead of the buttons 3A to 3C. The smartphone 1 may be provided with only one button for making operations related to the screen, or may be provided with no button. In the example illustrated in FIG. 5, the smartphone 1 is provided with two cameras, but the smartphone 1 may be provided with only one camera, or may be provided with no camera. In the example illustrated in FIG. 5, the smartphone 1 is provided with the three types of sensors for detecting the position and the attitude, but the smartphone 1 may not have some of these sensors, or may have another type of sensor for detecting at least one of the position and the attitude.

FIG. 7 is a schematic of an example how the display mode is changed based on the function provided by the control program 9A.

As illustrated in FIG. 7, the smartphone 1 displays the home screen 40 on the display 2A (Step S11). The home screen 40 on which icons are arranged has an arrangement of an icon 50a, an icon 50b, an icon 50c, an icon 50d, and an icon 50e, for example, as icons corresponding to the applications that communicate with the external. In the initial state, the smartphone 1 displays the icon 50a to 50e, which are arranged on the home screen 40, in a normal mode. In the embodiments, the initial state corresponds to the state before control is executed based on the function provided by the control program 9A, which is to be explained later, for example. In the embodiments, the normal mode corresponds to an image with a color, a design, a movement, and the like specified as default for an icon displayed on the display 2A when the smartphone 1 is in the initial state. Step S11 illustrates an example of the normal mode in which the icons are displayed in the color, the design, and the like specified as default.

The smartphone 1 then acquires a recommended communication speed for each of the applications that communicate with the external, compares the recommended communication speed with a current effective communication speed, and determines if there is any application the recommended communication speed of which cannot be satisfied by the current effective communication speed. As a result of the determination, if there is any application the recommended communication speed of which cannot be satisfied by the current effective communication speed, the smartphone 1 changes the display color, which is one element of the display mode, of the icon of the corresponding application (Step S12). Step S12 illustrates an example in which the display colors of the icon 50d corresponding to the video player application 9H and of the icon 50e corresponding to the SNS application 9I are changed from the default colors to other colors, among the icons arranged on the home screen 40.

At Step S12, the smartphone 1 calculates a current effective communication speed to be compared with the recommended communication speed, using an evaluation value of the communication speed based on the communication scheme, and an evaluation value of the communication speed based on retransmissions of received data addressed to the smartphone 1.

First of all, an example of the calculation of an evaluation value of the communication speed based on the communication scheme will now be explained. Explained hereunder is an example in which the base station transmits data by executing at least one of the adaptive modulation and the adaptive coding depending on the communication condition.

When the base station executes the adaptive modulation depending on the communication condition, the amount (bit count) of data received from the base station by the smartphone 1 via the communication unit 6 varies depending on the communication condition as well. For example, when the base station executes the adaptive modulation in which the quadrature phase-shift keying (QPSK) and the quadrature amplitude modulation (16QAM) are switch therebetween depending on the communication condition, the number of bits processed by the base station in one modulation (the number of bits per one pulse of a modulated carrier) is two bits or four bits. Accordingly, when the communication unit 6 supports the adaptive modulation, the effective communication speed achieved by the communication unit 6 (the amount of newly received data) varies depending on the communication condition. The smartphone 1 therefore calculates an average of the bit counts of the respective packets received from the base station via the communication unit 6 in the immediately prior predetermined time interval. An average bit count is normalized to an average bit count per second, for example.

The smartphone 1 then uses the average of the bit counts in the respective received packets as an evaluation value based on the communication scheme in the case where only the adaptive modulation is supported.

When the base station executes adaptive coding depending on the communication condition, the amount (bit count) of data received from the base station by the smartphone 1 via the communication unit 6 varies depending on the communication condition. For example, when the base station executes the adaptive coding, the base station increases the ratio of error correction data to be included in the transmission data when the communication condition is bad, and reduces the ratio of error correction data to be included in the transmission data when the communication condition is good. Thus, the amount of actual data (the bit count of the data excluding the error correction data) transmitted by the base station varies as well. Accordingly, when the communication unit 6 supports the adaptive coding, the effective communication speed achieved by the communication unit 6 varies depending on the communication condition. The smartphone 1 therefore calculates an average of the bit counts of the actual data (the data resultant of subtracting the error correction codes from the entire received data) included in the respective packets received via the communication unit 6 in the immediately prior predetermined time interval. An average bit count of the actual data is normalized to an average bit count per second, for example.

The smartphone 1 then uses the average bit count of the actual data included in the respective received packets as an evaluation value based on the communication scheme in the case where only the adaptive coding is supported.

When the base station executes both of the adaptive modulation and the adaptive coding, the amount of actual data received from base station by the communication unit 6 varies depending on the relation between the count of bits processed in one modulation, and the ratio of the error correction data included in the transmission data. The smartphone 1 therefore calculates an average of the counts of bits of the actual data (the data resultant of subtracting the error correction codes from the entire received data) included in the respective packets received via the communication unit 6, in the same manner as in the case where only the adaptive coding is supported. An average bit count of the actual data is normalized to an average bit count per second, for example.

The smartphone 1 then uses the average bit count of the actual data included in the respective received packets as an evaluation value based on the communication scheme in the case where the adaptive modulation and the adaptive coding are both supported.

An example of the calculation of the evaluation value of the communication speed based on the retransmissions of received data addressed to the smartphone 1 will now be explained.

The smartphone 1 calculates the evaluation value of the communication speed based on the retransmissions, on the basis of a ratio of the data for which retransmission is requested with respect to the entire received data (packets) addressed to the smartphone 1 within a predetermined time interval (retransmission ratio). For example, when the data for which retransmission is requested occupies 0 percent of the entire data addressed to the smartphone 1, the evaluation value is calculated as "1". When the data for which retransmission is requested occupies 50 percent of the entire data addressed to the smartphone 1, the evaluation value is calculated as "0.5".

The received data addressed to the smartphone 1 may be user data exchanged between an application currently running and a server, or control information such as notification information (e.g., a control channel, or network version information) received from the base station for the purpose of location registration.

An example of the calculation of the current effective communication speed will now be explained.

The smartphone 1 multiplies the evaluation value of the communication speed based on the communication scheme with the evaluation value of the communication speed based on retransmission of the data addressed to the smartphone 1, and uses the result as the current effective communication speed. For example, if the evaluation value of the communication speed based on the communication scheme is "364 bits" and the evaluation value of the communication speed based on retransmission of the data addressed to the smartphone 1 is "0.5", the smartphone 1 calculates the effective communication speed as "182 bits". By calculating the effective communication speed, the smartphone 1 can determine the upper boundary of the current communication speed even when no large-volume data is being communicated (when there is still some remaining bandwidth).

The communication unit 6 manages information such as the count of bits included in each of the packet, the count of bits of error correction data, and the ratio of the data for which retransmission is requested with respect to the entire data addressed to the smartphone 1.

In the manner described above, the smartphone 1 calculates the current effective communication speed. The smartphone 1 then compares the current effective communication speed with the recommended communication speed of each of the applications that communicates with the external. If there is any application the recommended communication speed of which cannot be satisfied by the current effective communication speed, the smartphone 1 changes the display mode of the icon corresponding to the application, as illustrated in FIG. 7.

In the example explained with reference to FIG. 7, the smartphone 1 changes the display color of the icon of the corresponding application to notify the user of which one of the applications has a recommended communication speed that cannot be satisfied by the current effective communication speed, but such a change is not limited to the example illustrated in FIG. 7. For example, the display mode of the icon may be changed in a way other than changing the display color of the icon.

FIG. 8 is a schematic of another example how the display mode is changed based on the function provided by the control program 9A. As illustrated in FIG. 8, the smartphone 1 displays the home screen 40 on the display 2A (Step S21). In the initial state, the smartphone 1 displays a plurality of icons in the normal mode. For example, in the example illustrated, the icons are displayed still, without moving, as the normal mode at Step S21.

If there is an application the recommended communication speed of which cannot be satisfied by the current effective communication speed, the smartphone 1 adds a movement, which is one element of the display mode, to the icon of the corresponding application (Step S22). At Step S22, among the icons arranged on the home screen 40, the icon 50d corresponding to the video player application 9H and the icon 50e corresponding to the SNS application 9I are changed to vibrating, from the condition being still that is the default condition.

Without limitation to the examples illustrated in FIGS. 7 and 8, the smartphone 1 may change the display mode of the icons in other ways. The smartphone 1 may change the display mode of the icon by, for example, causing the icon to vibrate or to blink, changing the brightness (pixel values) or transparency of the icon, displaying a frame around the icon, changing the color or thickness of the frame around the icon, or adding a symbol (e.g., "x" mark) to the icon.

Figure 9:
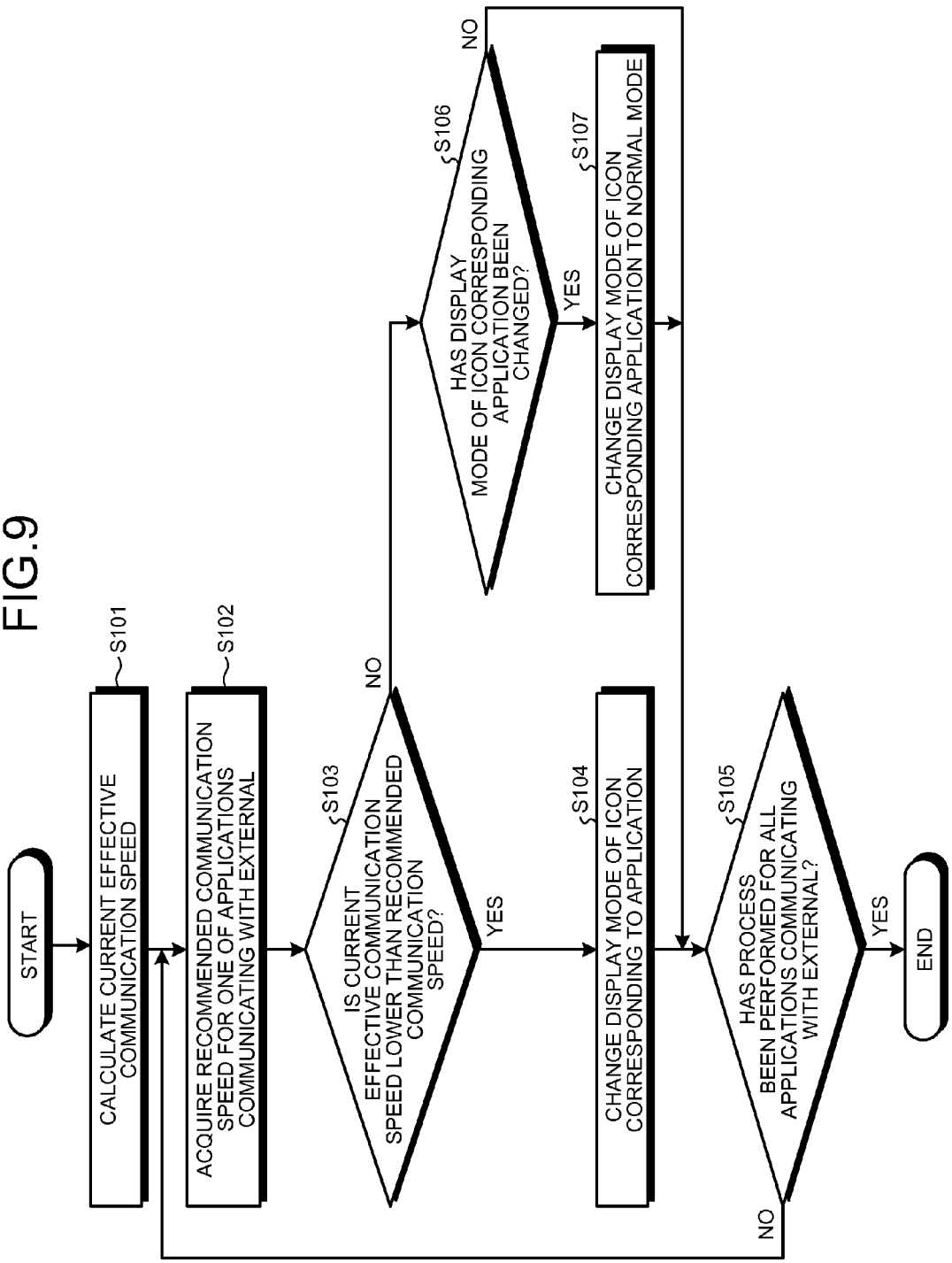
FIG. 9 is a schematic of an example of a process of control based on the function provided by the control program.

FIG. 9 is a schematic of an example of the process executed as control based on the function provided by the control program 9A. The process illustrated in FIG. 9 is implemented by causing the controller 10 to execute the control program 9A. The process illustrated in FIG. 9 is executed repetitively while the smartphone 1 is active, while the home screen 40 is being displayed on the display 2A, or at the timing at which the home screen 40 is displayed on the display 2A, for example.

As illustrated in FIG. 9, the controller 10 calculates the current effective communication speed at Step S101. For example, the controller 10 calculates a multiplication of the evaluation value of the communication speed based on the communication scheme and the evaluation value of the communication speed based on retransmission of the data addressed to the smartphone 1, as the effective communication speed.

At Step S102, the controller 10 acquires the recommended communication speed for one of the applications that communicate with the external from the storage 9. At Step S103, the controller 10 compares the current effective communication speed with the recommended communication speed acquired at Step S102, and determines if the current effective communication speed is lower than the recommended communication speed.

As a result of the determination, if the current effective communication speed is lower than the recommended communication speed (Yes at Step S103), the controller 10 changes the display mode of the icon corresponding to the application at Step S104. For example, the controller 10 changes the display color of the icon corresponding to the application.

At Step S105, the controller 10 determines if the process has been executed for all of the applications that communicate with the external.

As a result of the determination, if the process has not been executed for all of the applications that communicate with the external (No at Step S105), the controller 10 returns the process to Step S102, and executes the process illustrated in FIG. 9 for the next application. As a result of the determination, if the process has been executed for all of the applications that communicate with the external (Yes at Step S105), the controller 10 ends the process illustrated in FIG. 9.

At Step S103, as a result of the determination, if the current effective communication speed is not lower than the recommended communication speed (No at Step S103), the controller 10 determines if the display mode of the icon corresponding to the application has been changed at Step S106. The information of the icons the display mode of which has been changed is managed in the setting data 9Z stored in the storage 9, for example.

As a result of the determination, if the display mode of the icon corresponding to the application has been changed (Yes at Step S106), the controller 10 resets the display mode of the icons to the normal mode at Step S107, and shifts the process to Step S105. As a result of the determination, if the display mode of the icon corresponding to the application has not been changed (No at Step S106), the controller 10 shifts the process directly to Step S105.

As described above, the smartphone 1 changes the display mode of the icon corresponding to an application that communicates with the external via the communication unit 6, based on the conditions of communication with the external. For example, the smartphone 1 changes the display mode of the icon corresponding to the application the recommended communication speed of which cannot be satisfied by the current effective communication speed (communication speed that can be achieved in fact). Therefore, the smartphone 1 can notify a user of the availability of the applications communicating with the external.

One of the embodiments described above illustrates an example in which the smartphone 1 calculates the effective communication speed, compares the effective communication speed with the recommended communication speed of an application, and changes the display mode of the icon corresponding to the application, but the smartphone 1 may change the display mode of the icon based on the number of data retransmission. When there are a large number of data retransmissions, not only the communication speed of the communication unit 6 but also communication traffic congestion, a network delay, or the like may be the cause of the data retransmissions. In such a case, it is less likely for the applications that communicate with the external to be able to operate in a good communication environment. To address this issue, for example, the display mode of the icon corresponding to the application that communicates with the external may be changed when the number of retransmission requests exceeds a threshold in the immediately prior predetermined time interval. With such an approach, a user can be notified of the availability of the applications communicating with the external without calculating the effective communication speed.

For example, when synchronization cannot be established with a server in an application providing a function of synchronizing with the server, the controller 10 may change the display mode of the icon corresponding to the application providing the synchronizing function with the server. For example, when synchronization with the e-mail server cannot be established, the controller 10 may change the display mode of the icon corresponding to the e-mail application 9B that provides the function of establishing synchronization with the e-mail server.

The control program 9A stored in the storage 9 includes, for example, a checking function for executing a process of synchronizing with the e-mail server to check for newly arrived e-mails on the e-mail server, as an additional function related to the e-mail application 9B.

The controller 10 executes the control program 9A to perform the synchronizing process with the e-mail server based on the check function at a predetermined time interval. The synchronizing process is a process of checking for newly arrived e-mails on the e-mail server, and downloading the newly arrived e-mails. When synchronization with the e-mail server cannot be established, the controller 10 increments the number of times that synchronization cannot be established. The controller 10 then determines if the number of times that the synchronization cannot be established has reached a predetermined count. As a result of the determination, if the number of times that the synchronization cannot be established has reached the predetermined count, the controller 10 changes the display mode of the icon corresponding to the e-mail application 9B. As a result of the determination, if the number of times that the synchronization cannot be established has not reached the predetermined count, the controller 10 executes the synchronizing process again upon arrival of the next timing for the synchronizing process.

FIG. 10 is a schematic of another example of the control based on the function provided by the control program 9A.

As illustrated in FIG. 10, the smartphone 1 displays the home screen 40 on the display 2A (Step S31). If the synchronization with the e-mail server corresponding to the e-mail application 9B is established, the smartphone 1 displays the icon 50b corresponding to the e-mail application 9B in the normal mode.

The smartphone 1 then executes the synchronizing process with the e-mail server. If synchronization with the e-mail server cannot be established, the smartphone 1 increments the number of times that synchronization cannot be established. The controller 10 then determines if the number of times that the synchronization cannot be established has reached a predetermined count. As a result of the determination, if the number of times that the synchronization cannot be established has reached the predetermined count, as illustrated in FIG. 10, the controller 10 changes the display color, which is one element of the display mode, of the icon corresponding to the e-mail application 9B (Step S32).

Without limitation to the example illustrated in FIG. 10, the smartphone 1 may change the display mode of the icon corresponding to the application that fails to synchronize with the server, by causing the icon to vibrate, changing the brightness (pixel values) or transparency of the icon, displaying a frame around the icon, changing the color of the frame around the icon, or adding a symbol to the icon, for example.

The example illustrated in FIG. 10 illustrates a case in which the display mode of the icon corresponding to the e-mail application 9B is changed when synchronization with the e-mail server is not established, but the application providing synchronizing function is not limited thereto. For example, for any application establishing synchronization with any server, such as an application update server, the display mode of the corresponding icon may be changed when synchronization with a server cannot be established.

Figure 11:
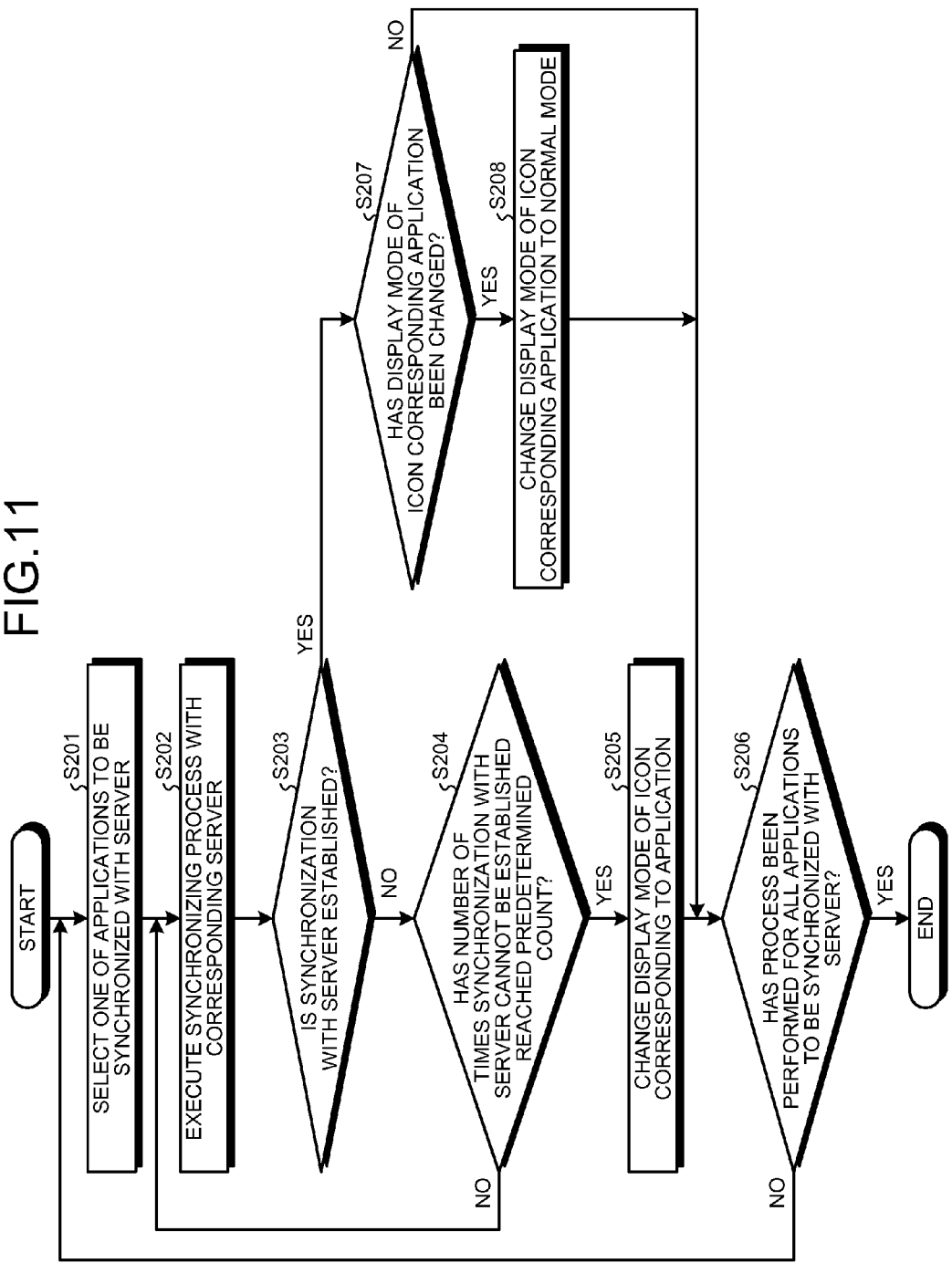
FIG. 11 is a schematic of another example of the process executed as control based on the function provided by the control program.

FIG. 11 is a schematic of another example of the process executed as the control based on the function provided by the control program 9A. The process illustrated in FIG. 11 is implemented by causing the controller 10 to execute the control program 9A. The process illustrated in FIG. 11 is executed at a predetermined polling cycle at which the synchronizing process is performed with the server, for example.

As illustrated in FIG. 11 at Step S201, the controller 10 selects one of the applications to be synchronized with the server. At Step S202, the controller 10 executes the synchronizing process with the corresponding server for the application selected at Step S201. At Step S203, the controller 10 determines if the synchronization with the server is established.

As a result of the determination, if the synchronization with the server cannot be established (No at Step S203), the controller 10 increments the number of times that synchronization cannot be established, and determines if the number of times that the synchronization cannot be established has reached a predetermined count at Step S204.

As a result of the determination, if the number of times that the synchronization cannot be established has reached the predetermined count (Yes at Step S204), the controller 10 changes the display mode of the icon corresponding to the application at Step S205. As a result of the determination, if the number of times by which the synchronization cannot be established has not reached the predetermined count (No at Step S204), the controller 10 returns the process to Step S202.

At Step S206, the controller 10 determines if the process has been executed for all of the applications to be synchronized with the corresponding server.

As a result of the determination, if the process has not been executed for all of the applications to be synchronized with a server (No at Step S206), the controller 10 returns the process to Step S201, selects the next application, and executes the process illustrated in FIG. 11. As a result of the determination, if the process has been executed for all of the applications to be synchronized with a server (Yes at Step S206), the controller 10 ends the process illustrated in FIG. 11.

As a result of the determination, if the synchronization with the server is established at Step S203 (Yes at Step S203), the controller 10 determines if the display mode of the icon corresponding to the application has been changed at Step S207. The information of the icons the display mode of which has been changed is managed in the setting data 9Z stored in the storage 9, for example.

As a result of the determination, the display mode of the icon corresponding to the application has been changed (Yes at Step S207), the controller 10 resets the display mode of the icons to the initial state at Step S208, and shifts the process to Step S206. As a result of the determination, if the display mode of the icon corresponding to the application has not been changed (No at Step S207), the controller 10 shifts the process directly to Step S206.

The example illustrated in FIG. 11 illustrates a case in which the display mode of the icon corresponding to the application is changed if the number of times that the synchronization with the server has failed reached a predetermined count at Step S204, but the embodiments are not limited thereto. The display mode of the icon corresponding to the application may be changed when a predetermined time has elapsed from when the synchronization with the server is lost for the first time.

Figure 12:
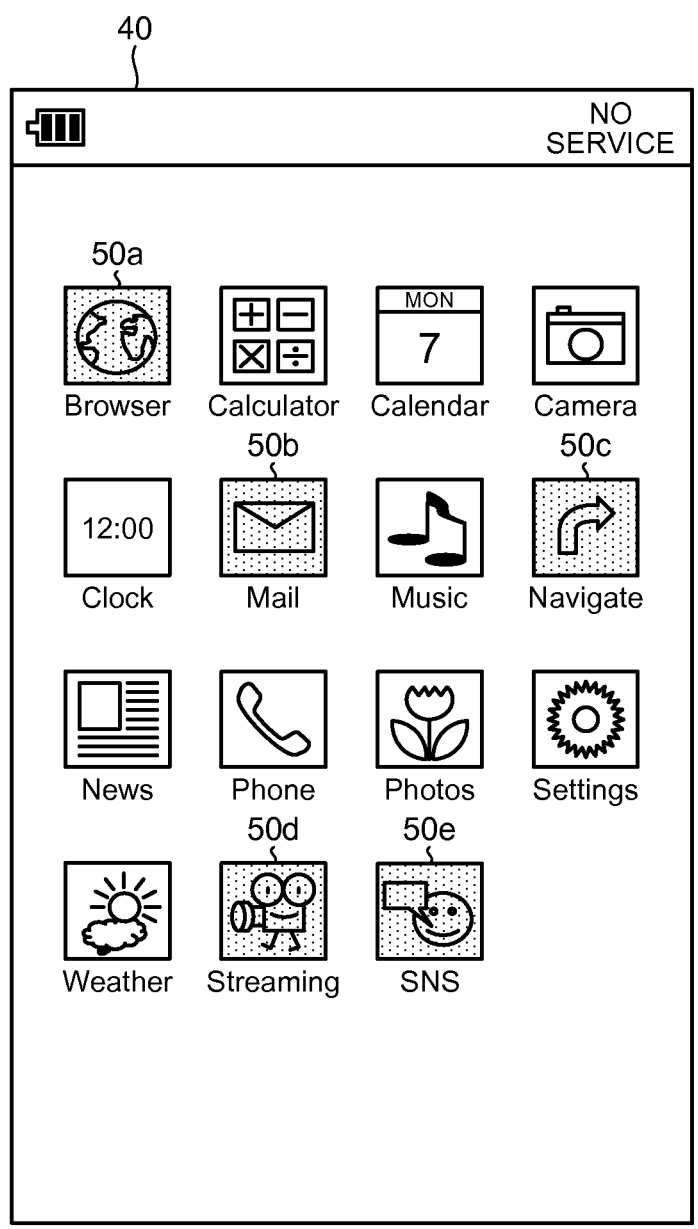
FIG. 12 is a schematic of an example of a display mode of the icons arranged on the home screen.

In the embodiments described above, for example, when the smartphone 1 is incapable of communicating with the external, in other words, when the smartphone 1 is outside of the service area, the smartphone 1 may change the display mode of each of the icons corresponding to the applications that communicate with the external. FIG. 12 is a schematic of an example of the display mode of the icons arranged on the home screen 40. As illustrated in FIG. 12, when the smartphone 1 is out of the service area, the smartphone 1 changes the display color of the icon 50a, the icon 50b, the icon 50c, the icon 50d, and the icon 50e corresponding to the applications that communicate with the external, among those arranged on the home screen 40.

In the embodiments described above, the smartphone 1 may change the display of the icon corresponding to an application that communicates with the external based on a difference between the current effective communication speed and a communication speed corresponding to the bandwidth currently in use. For example, when an enormous amount of data is being downloaded on the background by the function provided by an application, the performance of the other applications communicating with the external is affected, despite the effective communication speed may be high. The display mode of the icons corresponding to the other applications communicating with the external may then be changed.

One of the embodiments described above illustrates an example in which the smartphone 1 changes the display mode of the icon corresponding to an application that communicates with the external based on the downlink effective communication speeds, but the embodiments are not limited thereto. For example, the smartphone 1 may change the display mode of the icon corresponding to the application that communicates with the external based on the uplink effective communication speed and the downlink effective communication speed, or based on one of them.

In the embodiments described above, the smartphone 1 may be enabled to be configured to change the display mode of the icon corresponding to an application that communicates with the external based on which one of the uplink effective communication speed or the downlink effective communication speed.

Although the art of appended claims has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

In the embodiments, the smartphone has been explained as an example of the device provided with the touch screen; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, and television receivers.

The invention claimed is:

1. An electronic device comprising:
    a display configured to display an icon corresponding to an application that performs communication with external; and
    a controller configured to:
    change a display mode of the icon corresponding to the application based on a condition of the communication with the external;
    calculate a communication speed corresponding to the condition of the communication based on a communication scheme and a retransmission ratio; and
    change the display mode of the icon based on a result of a comparison between the calculated communication speed and a recommended communication speed for execution of the application.

2. The electronic device according to claim 1, wherein the controller is configured to change the display mode of the icon based on availability of communication with a server based on a function of the application.

3. A control method executed by an electronic device including a display, the control method comprising:
    displaying an icon corresponding to an application that performs communication with external;
    calculating a communication speed corresponding to a condition of the communication based on a communication scheme and a retransmission ratio; and
    changing the display mode of the icon based on a result of a comparison between the calculated communication speed and a recommended communication speed for execution of the application.

4. A non-transitory storage medium that stores a control program that causes, when executed by an electronic device including a display, the electronic device to execute:
    displaying an icon corresponding to an application that performs communication with external;
    calculating a communication speed corresponding to a condition of the communication based on a communication scheme and a retransmission ratio; and
    changing the display mode of the icon based on a result of a comparison between the calculated communication speed and a recommended communication speed for execution of the application.

* * * * *